Patented June 11, 1946

2,402,016

UNITED STATES PATENT OFFICE 2,402,016

SULPHONIUM SALTS

Edgar C. Britton and John N. Hansen, Midland, Mich., assignors to The Dow Chemical Company, Midland, Mich., a corporation of Michigan No Drawing. Application October 2, 1944, Serial No. 556,902

7 Claims. (Cl. 260—607)

The present invention is concerned with the sulphonium salts of chlorophenols and is particularly directed to compounds of the following formula:

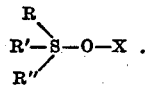

wherein R, R', and R'' each represents the same or different alkyl, hydroxyalkyl or aralkyl radical, and —O—X represents a substituted phenoxy radical characterized by at least one nuclear-substituted chlorine. The preferred embodiment of the —O—X portion of the foregoing structure is that in which —O—X represents

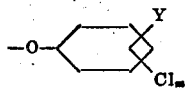

wherein Y is hydrogen, alkyl, or aryl, and $m$ is an integer not greater than 5.

We have prepared representative members of this class of compounds and found them to be crystalline solids or viscous liquids somewhat soluble in organic solvents and water. These compounds are useful as insecticides, fungicides, additaments for plastic compositions, and the like.

Among the groups which may be represented by R, R', and R'' in the foregoing formula are methyl, ethyl, normalpropyl, isopropyl, normalbutyl, secondarybutyl, isobutyl, tertiarybutyl, normalamyl, secondaryamyl, isoamyl, tertiaryamyl, normalhexyl, secondaryhexyl, normaloctyl, secondaryoctyl, dodecyl, hexadecyl, octadecyl, or any other alkyl radical containing from 1 to 18 carbon atoms, inclusive. Representative hydroxyalkyl radicals symbolized by R, R', and R'' are 2-hydroxy-ethyl, 2-hydroxy-propyl, 3-hydroxy-propyl, 4-hydroxy-butyl, hydroxyamyl, etc. The aralkyl radicals represented by the "R" symbols include benzyl, alpha-phenylethyl, beta-phenylethyl, beta-(alpha-naphthyl)-ethyl, gamma-phenylpropyl, delta-phenylbutyl, alpha-phenylbutyl, omega-phenyloctyl, etc. The Y symbol in the preferred embodiment of —O—X may be of any of the alkyl radicals set forth in illustrating the R symbols or phenyl, methylphenyl, tertiarybutyl-phenyl, chlorophenyl, bromo-phenyl, 2.4-dichloro-phenyl, etc.

The new compounds may be prepared by reacting a suitable sulphonium iodide, chloride or bromide with a chlorophenol in the presence of an alkali-metal hydroxide, such as sodium hydroxide. This is conveniently accomplished by dissolving the chlorophenol in aqueous alkali and thereafter adding the sulphonium halide product portionwise to the mixture with stirring at temperatures up to 100° C. The reaction is generally complete within a few minutes, after which the mixture is cooled and the sulfonium salt of chlorophenol compound recovered by filtration, salting-out, or layering-off of the aqueous portion of the reaction mixture, depending upon whether the phenolic reaction product is a crystalline solid or an oil. The resulting salt product may be purified as by recrystallization, washing with water or other solvent, treatment with bone charcoal, etc.

The sulphonium halides employed as starting materials in accordance with the present invention are readily prepared by reacting an organic sulphide containing two of the desired R groups as set forth in the formula with an organic halide embodying the other R radical. A spontaneous addition reaction is obtained whereby the sulphonium halide is formed. In a representative preparation, methyl-ethyl sulphide is caused to react with methyl iodide to produce dimethyl ethyl sulphonium iodide.

The following examples illustrate the invention but are not to be construed as limiting:

Example 1

8 grams (0.03 mole) of pentachlorophenol was dissolved in a solution of 1.2 grams (0.03 mole) of sodium hydroxide in 35 milliliters of water. 45 milliliters of an aqueous solution containing 0.03 mole of dinormalbutyl-methyl sulphonium iodide was then mixed with the aqueous sodium pentachlorophenolate. Heat of reaction was evolved. When the reaction mixture was cooled, an oil separated out. This oily product was recovered by decantation, washed, and dried in a vacuum desiccator to obtain 10 grams of the dinormalbutyl-methyl sulphonium salt of pentachlorophenol as a hygroscopic solid melting at 83°–90° C. This product is soluble in benzene, somewhat soluble in water, and difficultly soluble in petroleum ether (boiling at 100°–140° C.).

Example 2

46.2 grams (0.2 mole) of 2.3.4.6-tetrachlorophenol was dissolved in a solution of 8.0 grams (0.2 mole) of sodium hydroxide in 100 milliliters of water. The resulting solution was filtered, and 43.6 grams (0.2 mole) of crystalline dimethyl-ethyl sulphonium iodide added thereto with stirring. The reaction mixture was allowed to stand for several hours and thereafter cooled. An excess of sodium chloride was dissolved in the mixture to salt out a viscous oil. This oil was dried to obtain 42 grams of a dimethyl-ethyl sulphonium salt of 2.3.4.6-tetrachlorophenol product as a hygroscopic solid.

*Example 3*

20.5 grams (0.1 mole) of 3-chloro-4-hydroxy-diphenyl was dissolved in 60 milliliters of aqueous caustic solution containing approximately 0.1 mole of sodium hydroxide at 50° C. A solution of 24.6 grams (0.1 mole) of triethyl sulphonium iodide in 25 milliliters of water was added to the phenolate solution. The mixture was then heated on a steam bath for 4 hours, at the end of which time a yellow oil had separated from solution. This oil crystallized on cooling. The crystalline product was washed with water, and dried to obtain the triethyl sulphonium salt of 3-chloro-4-hydroxy-diphenyl melting at 67°–68° C., difficultly soluble in water, and soluble in methyl alcohol.

*Example 4*

24 grams (0.09 mole) of pentachlorophenol was dissolved in 59 milliliters of dilute aqueous caustic containing 0.09 mole of sodium hydroxide. 10 milliliters of an aqueous solution of 0.09 mole of dinormalbutyl-methyl sulphonium methylsulphate was added to the pentachlorophenolate solution. A dark oil separated out of the reaction mixture on standing. This oil was separated, washed with water, dried, and dispersed in carbon tetrachloride with stirring. The resulting dispersion was cooled and filtered to obtain the dinormalbutyl-methyl sulphonium salt of pentachlorophenol as a white crystalline product melting at 120°–124° C. This product was slightly soluble in water, and somewhat soluble in carbon tetrachloride.

*Example 5*

26.6 grams (0.1 mole) of pentachlorophenol and 4.0 grams (0.1 mole) of sodium hydroxide were dissolved in 100 milliliters of hot water, filtered, and 20.25 grams (0.1 mole) of tri-(2-hydroxy-ethyl) sulphonium chloride crystals added thereto. The latter compound quickly passed into solution. After standing for a short while, a light colored oil settled out of the reaction mixture. 10 grams of sodium chloride was dissolved in the reaction mixture to recover further oil by the salting-out process. The total immiscible oil product was then recovered by decantation. The separated oil solidified upon standing. The crude product was recrystallized out of water to obtain the tri-(2-hydroxy-ethyl) sulphonium salt of pentachlorophenol as white crystals melting at 124°–127° C. This product was slightly soluble in water, soluble in methyl alcohol, and insoluble in chloroform. Upon recrystallization from a mixture of methyl alcohol and chloroform, the melting point of the salt product was increased to 126°–128° C.

*Example 6*

19.7 grams (0.1 mole) of 2.4.5-trichlorophenol, 4 grams (0.1 mole) of sodium hydroxide, and 50 milliliters of water were mixed together to form a sodium 2.4.5-trichlorophenolate solution. 70 milliliters of a normalbutyl-methyl-secondary-octyl sulphonium methylsulphate solution containing 0.1 mole of the sulphonium compound was added to the trichlorophenolate solution with mixing. A straw colored oil separated out of the reaction mixture on standing. This oil was recovered by decantation, washed with water, and dried. The resulting product was normalbutyl-methyl-secondaryoctyl sulphonium salt of 2.4.5-trichlorophenol, slightly soluble in water, soluble in ethanol, and not readily decomposed by either acids or alkalies.

The sulphonium salts of chlorophenols as described in the preceding examples may be employed as active toxicants in parasiticidal compositions. In such use the compounds are preferably employed in combination with an inert carrier. All of these compounds exert a definite insecticidal and fungicidal action and have been found particularly well adapted for use in fungicidal spray or dust compositions. Most of the compounds are somewhat soluble in water and impart to aqueous solutions desirable wetting properties.

When employed in dust mixtures, the sulphonium salts are preferably dispersed in or on solid finely-divided inert carriers such as diatomaceous earth, volcanic ash, bentonite, talc, finely-divided wood flour, and the like. Dust compositions comprising from about 0.5 to 10 per cent by weight of the salt are particularly useful.

Mixtures of the sulphonium salts with solid inert carriers may also be dispersed in water and employed as sprays. In preparing dust mixtures for use in dispersion, the sulphonium salts may be employed in amounts up to 80 to 90 per cent by weight of the concentrate.

Similarly, aqueous solutions or dispersions of the sulphonium salts or solutions and dispersions thereof in such solvents as alcohol, carbon tetrachloride, and petroleum distillate, are useful for insect and fungus control.

Various wetting, sticking, and dispersing agents, such as glyceryl oleate, alkali metal caseinates, aluminum naphthenate, alkali metal salts of sulphonated aromatic hydrocarbons or phenols, sodium lauryl sulphate, partially neutralized sulphuric acid derivatives of fatty acids and oils, blood albumin, soap, and the like may be employed in combination with the new sulphonium salts in either dust or spray compositions. Similarly, the new salts may be employed in combination with other insecticidal and fungicidal agents, such as lead arsenate, petroleum oil, nicotine, sulphur, copper sprays, pyrethrins, rotenone, cryolite, and the like.

The following examples illustrate the use of the sulphonium salts in parasiticidal compositions.

*Example 7*

Representative sulphonium salts of chlorophenols were dissolved in 95 per cent ethanol and the resulting solutions employed for the treatment of canvas. After the canvas pieces had been thoroughly wet with an amount of the solution calculated to give about 2.0 per cent by weight deposit of the sulphonium salt therein, the pieces were dried and exposed to attack by *Chaetomium globosum* and *Aspergillus niger*. Canvas sections containing 1.92 per cent, 1.90 per cent, and 1.86 per cent of normalbutyl-methyl-secondaryoctyl sulphonium salt of 2.4.5-trichlorophenol, dimethylethyl sulphonium salt of 2.3.4.6-tetrachlorophenol, and dinormalbutyl-methyl sulphonium salt of pentachlorophenol gave 100 per cent control of the test organisms. Untreated canvas pieces concurrently exposed to the organisms were completely covered with vigorous mold growth.

*Example 8*

20 parts by weight of tri-(2-hydroxy-ethyl) sulphonium salt of pentachlorophenol was dissolved in alcohol and the alcohol solution used to wet 80 parts by weight of diatomaceous earth. The resulting composition was dried and hammer-milled to obtain a fungicide concentrate. 2.5 pounds of this product and 0.25 pound of sodium lauryl sulphate were dispersed in 100 gallons of water and the resulting spray applied to the mildew-infested primary leaves of cranberry bean plants. An 87 per cent control of mildew was thereby obtained.

*Example 9*

In a similar fashion, parasiticide concentrates were prepared by incorporating 20 parts by weight of several representative sulphonium salts with diatomaceous earth. These concentrates were dispersed in water along with 0.25 pound of sodium lauryl sulphate per 100 gallons to obtain spray mixtures which were employed for the control of greenhouse red spider. At a sulphonium salt concentration of one pound per 100 gallons, dinormalbutyl-methyl sulphonium salt of pentachlorophenol and normalbutyl-methyl - secondaryoctyl sulphonium salt of 2.4.5-trichlorophenol gave kills of 88 per cent and 86 per cent, respectively. At 0.5 pound per 100 gallons, tri-(2-hydroxy-ethyl) sulphonium salt of pentachlorophenol gave a kill of the test organism of 96 per cent.

*Example 10*

1 part by weight of dimethyl-ethyl sulphonium salt of 2.3.4.6-tetrachlorophenol was dispersed on 99 parts by weight of finely-divided pyrophyllite. The resulting composition was employed as a dust for the control of a *Fomes annosus* type organism identified as FPL No. 517. In four different determinations, the composition gave 100 per cent control. A control of 100 per cent also was obtained with a dust fungicide containing 1 part by weight of dinormalbutyl-methyl-sulphonium salt of pentachlorophenol on 99 parts of pyrophyllite.

The foregoing examples have described the preparation of representative sulphonium salts of chlorophenols and shown the use of these compounds in parasiticidal compositions. By substituting other chlorophenols and sulphonium salts for those shown in Examples 1-6, closely related compounds are obtained adapted to be employed as described in Examples 7-10. Illustrative of the sulphonium salts of phenols so obtained are benzyl-dimethyl sulphonium salt of 5.5'-dichloro-2-hydroxy-diphenyl, beta-phenyl-ethyl-di-(2-hydroxy-ethyl) sulphonium salt of 3.5.$x$-trichloro - 2 - hydroxy-diphenyl, di-(2 - hydroxyethyl) - normaloctyl sulphonium salt of tetrachloro-orthocresol, normaloctadecyl-diethyl sulphonium salt of 4 - chlorophenol, benzyl-methyl-(2-hydroxy-ethyl) sulphonium salt of 4'-chloro-3.5-dimethyl - phenol, tri - (3 - hydroxypropyl) sulphonium salt of 2.4-dichloro-6-secondarybutyl-phenol, tribenzyl sulphonium salt of 2.4-dichloro-6-methyl - phenol, mono-(3-hydroxy-propyl)-dibenzyl sulphonium salt of 2-chloro-4-tertiaryoctyl-phenol, etc.

We claim:

1. A compound having the formula

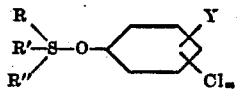

wherein R, R' and R" each represents a member of the group consisting of alkyl, hydroxyalkyl, and aralkyl radicals, Y is a member of the group consisting of hydrogen, alkyl, and aryl radicals, and $m$ is an integer not greater than 5.

2. A compound having the formula

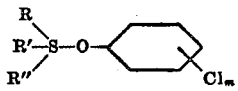

wherein R, R' and R" each is selected from the group consisting of alkyl, hydroxyalkyl, and aralkyl, and $m$ is an integer not greater than 5.

3. A compound having the formula

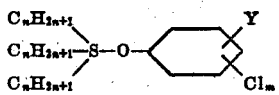

wherein Y represents a member of the group consisting of hydrogen, alkyl, and aryl radicals, $n$ is an integer, and $m$ is an integer not greater than 5.

4. A compound having the formula

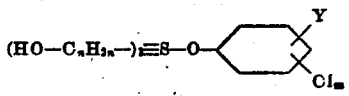

wherein Y is selected from the group consisting of hydrogen, alkyl, and aryl, $n$ is an integer, and $m$ is an integer not greater than 5.

5. The dimethyl-ethyl sulphonium salt of 2.3.4.6-tetra-chlorophenol.

6. The dinormalbutyl-methyl sulphonium salt of pentachlorophenol.

7. The tri-(2-hydroxyethyl) sulphonium salt of pentachlorophenol.

EDGAR C. BRITTON.
JOHN N. HANSEN.